United States Patent [19]
Brooks et al.

[11] 3,845,340
[45] Oct. 29, 1974

[54] DYNAMOELECTRIC MACHINE ROTOR

[75] Inventors: Kenneth R. Brooks, Dexter; Axaybabu M. Dave, Ypsilanti, both of Mich.; Tushar D. Kothari, Bombay, India

[73] Assignee: Ford Motor Company, Dearborn, Mich.

[22] Filed: Apr. 30, 1973

[21] Appl. No.: 355,998

[52] U.S. Cl. .............................. 310/217, 310/264
[51] Int. Cl. ................................... H02k 1/06
[58] Field of Search .......... 310/217, 216, 218, 179, 310/180, 185, 188, 192, 193, 195, 261, 263, 265, 269; 336/230

[56] References Cited
UNITED STATES PATENTS

| | | | |
|---|---|---|---|
| 1,237,459 | 8/1917 | Bijur | 310/265 |
| 2,435,911 | 2/1948 | Van Der Woude | 310/216 UX |
| 2,458,112 | 1/1949 | Steinmeyer | 336/210 X |
| 2,541,830 | 2/1951 | Phaneuf | 310/261 UX |
| 2,892,111 | 6/1959 | Young | 310/195 |
| 3,062,979 | 11/1962 | Jarret | 310/269 |
| 3,171,049 | 2/1965 | Jarret | 310/193 |

*Primary Examiner*—R. Skudy
*Attorney, Agent, or Firm*—Robert A. Benziger; Keith L. Zerschling

[57] ABSTRACT

A dynamoelectric machine rotor comprised of a plurality of paired lamina structures is disclosed. Each pair is comprised of first and second lamina members and has an even plurality of radially directed finger segments alternate ones of which are arranged to have radially and axially extending flux gathering portions. The members of each pair are arranged so that when a plurality of pairs are arranged in nesting relationship along an armature shaft, the axial core of the composite structure will be substantially solid while the radially and axially directed flux gathering portions will be in overlapping abutting relationship.

8 Claims, 3 Drawing Figures

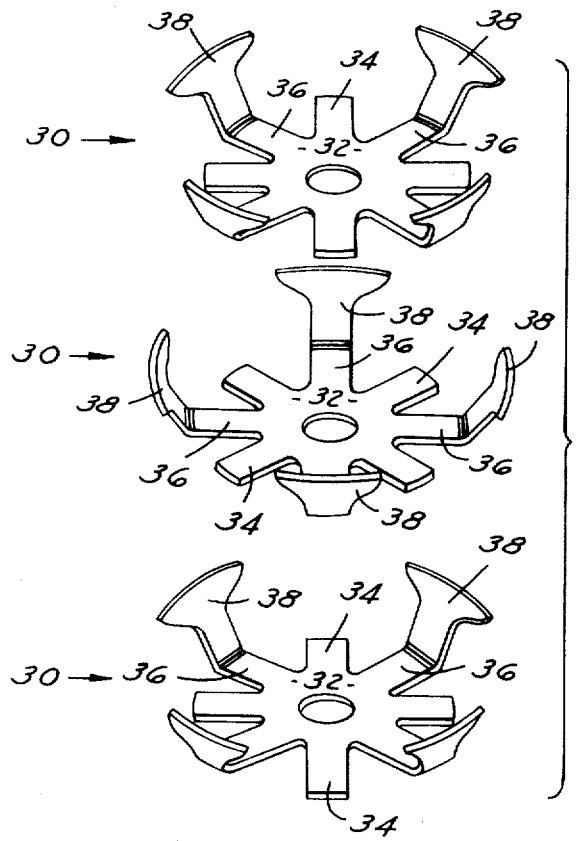

3,845,340

DYNAMOELECTRIC MACHINE ROTOR

CROSS REFERENCE TO RELATED APPLICATION

This application is an improvement to the invention disclosed in copending commonly assigned patent application Ser. No. 356,000 titled "Laminated Rotor Structure For A Dynamoelectric Machine" filed in the names of Anthony S. Ryff and Theodore W. Daykin on the same day as this application.

BACKGROUND OF THE INVENTION

1. Field of the Invention

The present invention is related to the field of dynamoelectric machines in general and more particularly to that portion of the above noted field which is concerned with the provision of laminated rotor or armature structures for such machines.

2. Description of the Prior Art

As described in the above noted copending patent application, a laminated rotor structure is disclosed in which the rotor structure is provided with a greatly enlarged flux gathering or flux exchanging area than is normally proved by such a structure having the same axial core length and diameter. This is obtained by providing a radially and axially directed flux gathering end portion for the finger segments so that the axial length of the flux gathering area greatly exceeds the axial length of the core of the rotor structure. However, in attempting to implement this technique on a production basis we became aware of the fact that the nesting of a plurality of substantially identical lamina to provide the desired rotor structure would result in a number of air gaps or voids between individual lamina which would greatly decrease the flux carrying capability of the rotor structure or conversely would greatly increase the axial core length and hence the required amount of electrical conductor, typically copper wire, to achieve a desired level of flux. It is therefore a specific object of the present invention to provide a rotor or armature structure which does not have any significant air gaps or voids at its interior region. It is a more particular object of the present invention to provide such a rotor or armature structure which has an axial length at its core which is substantially less than the axial length presented at the flux gathering or flux exchange region. It is a further object of the present invention to provide such a rotor or armature core which may be readily assembled by conventional assembly techniques. More particularly still it is a specific object of the present invention to provide lamina configurations which may be readily assembled to form a laminated armature or rotor core.

SUMMARY OF THE PRESENT INVENTION

The present invention contemplates the provision of a plurality of pairs of lamina with alternate ones of the radially projecting fingers being provided with flux gathering members having both a radial and an axial extent. The angular relationship between the flux gathering segments and the radially directed fingers to which they are connected is determined as a function of the thickness of the lamina members of the nested pair. The bend angle can be suitably selected so that when a plurality of pairs are stacked to form the laminated core structure of a dynamoelectric machine rotor or armature, the lamina will be in nesting relationship and a large number of high reluctance voids or air gaps will be avoidable. In a first embodiment, the pairs are comprised of a first lamina member having a flux gathering portion with both a radial and an axial extent connected to each of the radially directed fingers while the second member of the pair does not have any flux gathering segments. An alternative embodiment provides each lamina member of the pair with a flux gathering portion on alternate ones of the radially extending fingers. The members of the pair are rotated with respect to one another so that the flux gathering portions of the first member of the pair will be interposed circumferentially between the flux gathering members of the second pair and in registry with a radially directed finger which does not include a flux gathering portion.

BRIEF DESCRIPTION OF THE DRAWINGS

FIG. 3 shows an exploded view of an alternative embodiment of the lamina pairs of the present invention wherein each lamina member of a pair may be identical.

DETAILED DESCRIPTION OF THE PREFERRED EMBODIMENT

Figure 1:
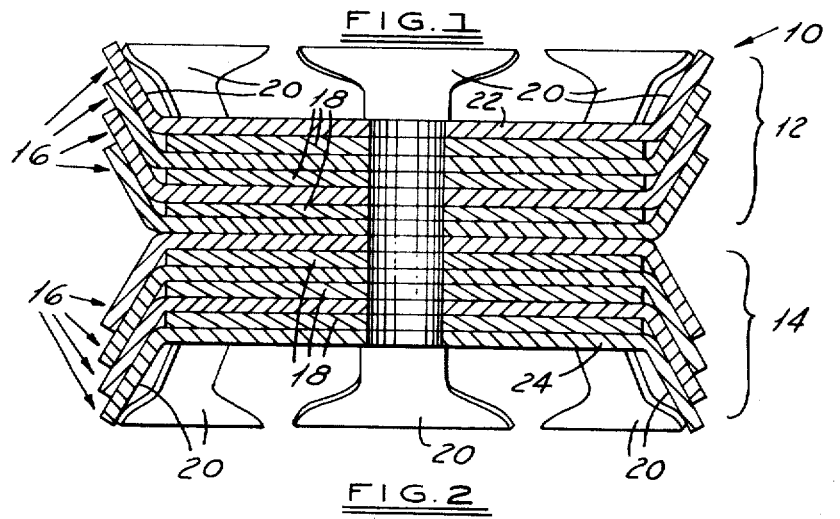
FIG. 1 shows a sectional view of a rotor or armature core member of a dynamoelectric machine formed of a plurality of lamina in accordance with the teachings of the present invention.

Referring now to FIG. 1, a dynamoelectric machine rotor or armature core 10 fabricated using the lamina pairs according to the present invention is illustrated in a sectional view. The rotor 10 is comprised of a plurality of first and second laminated sections 12 and 14. Laminated section 12 is comprised of first and second lamina members 16, 18 arranged in alternating relationship. The first lamina members 16 include radially and axially extending flux gathering portions 20 arranged to be in overlapping, abutting relation while second lamina members 18 comprise flux carrying spacers interposed between the lamina members 16. Laminated section 14 is essentially identical and is arranged in back-to-back relation with laminated section 12 so that the flux gathering portions 20 of laminated section 12 are directed upwardly relative to FIG. 1 while the flux gathering portions of laminated section 14 are directed downwardly relative to FIG. 1. The flux gathering portions 20 of one laminated section 12, 14 are thus directed away from the other laminated section 14, 12.

Figure 2:
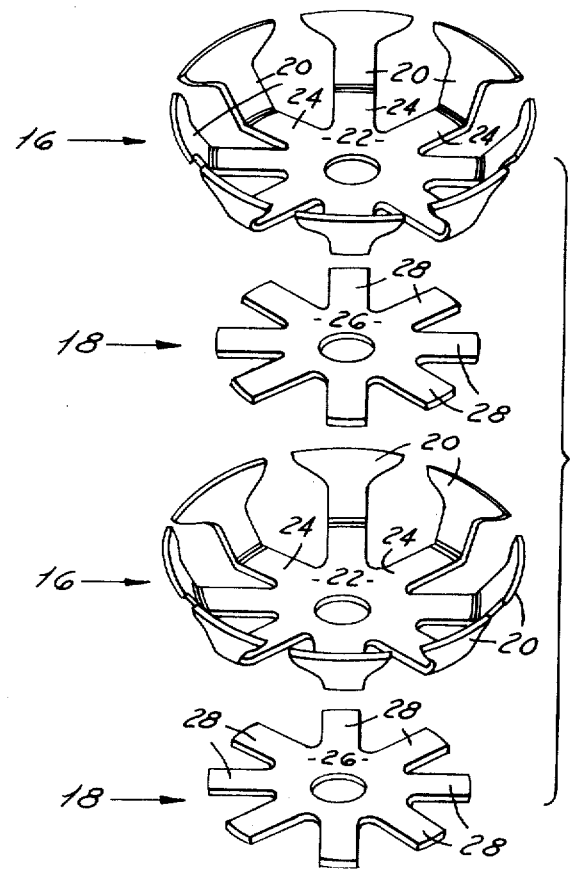
FIG. 2 illustrates an exploded perspective view of a portion of FIG. 1 showing a first embodiment of the lamina pairs according to the present invention.

Referring now to FIG. 2, a first embodiment for forming the lamina pair according to the present invention is illustrated. As shown in FIG. 2, four lamina comprising two lamina pairs are shown in an axially spaced apart relationship in a perspective view. The first lamina members 16 are provided with a central core portion 22 from which extend a plurality of radial finger members 24 each of which terminates in a flux gathering portion 20. The flux gathering portion 20 is arranged to be at an angle with respect to the fingers 24 so as to have both a radial and an axial extent.

The second lamina member 18 of the pair is similarly provided with a central core portion 26 and a plurality of radially extending finger members 28. However, the second lamina member 16 is not provided with any flux gathering portions at the end of the radially directed finger members 28 comparable to the flux gathering portions 20 of first lamina members 16. The second lamina members 18 are substantially identical to the first lamina members 16 except for the flux gathering portions 20. Thus central core portions 22, 26 and radially extending finger elements or members 24, 28 are substantially identical and will be radially coextensive when placed in assembled relationship.

Referring now to FIG. 3, an alternate embodiment of the lamina pair formation according to the present invention is illustrated. In this embodiment, three substantially identical lamina members 30 are shown. Any two adjacent lamina members 30 may be considered to form a lamina pair. Each lamina member 30 has a central core portion 32 from which extend a first plurality of radial finger elements 34. A second plurality of radial finger elements 36 is arranged to extend from the core portion 32 intermediate the finger elements 34 so as to be in alternating relationship with respect to the first finger elements. Each of the second finger elements 36 terminates in a flux gathering member 38 which is arranged to be at an angle with respect to the finger portion 36 so as to have both a radial and an axial extent. A lamina pair is thus formed by axially arranging two lamina members 30 so that the first finger members 34 of one lamina are in axial registry with the second finger members 36 of the other lamina of the lamina pair. The FIG. 3 embodiment is thus advantageous in that it utilizes a plurality of substantially identical lamina members 30 whereas the FIG. 2 embodiment requires two dissimilar lamina members 16 and 18.

With reference now to FIG. 1, it can be seen that the rotor or armature core fabricated in accordance with the teachings of the present invention as embodied in FIG. 2 is comprised of a plurality of suitably arranged lamina pairs plus individual lamina members 16 at the axially remote ends of the rotor or armature core 10. The angular relation between the flux gathering portions 20, 38 and their associated radially directed finger elements 24, 36 may be determined by the equation $$\alpha = \arc \cos t_1/t_1 + t_2$$

where $\alpha$ is the angle through which the flux gathering portion must be bent from the plane defined by the radial direction, $t_1$ is the thickness of the lamination having the flux gathering means angularly associated with a radially directed finger element and $t_2$ is the thickness of the other lamination of the pair. For identical thicknesses, $\alpha$ becomes 60°.

It will also be seen that in the FIG. 2 embodiment, a lamina pair comprised of lamina members 16 and 18 provides axially alternating flux gathering portions 20 by arranging all the radially directed fingers 24 of lamina member 16 to terminate in flux gathering portions 20. In the FIG. 3 embodiment, the axially alternating flux gathering portions are provided by having circumferentially alternating ones of the radially directed fingers 36 terminate in flux gathering portions 38 and rotationally displacing axially adjacent ones of the lamina members 30.

It can thus be seen that the present invention accomplishes its stated objectives. By arranging alternating radially directed finger elements to terminate in a flux gathering portion angularly arranged with respect to the finger element, a rotor core may be conveniently fabricated. By further defining the angular relationship between the radially directed finger elements and their flux gathering portions in terms of the thickness of the adjacent lamina, the nesting relationship may be provided in a convenient form which does not involve deleterious gaps and voids within hte body of the rotor core while nevertheless providing a rotor core flux gathering portion having an enlarged axial extent and hence increased flux gathering area.

We claim:

1. A laminated rotor or armature core for a dynamoelectric machine comprising in combination:
   a plurality of nesting lamina members, each having a plurality of radially directed finger elements; and
   a plurality of flux gathering portions, having both a radial and an axial extent, connected to axially alternate ones of the radially directed fingers the plurality of lamina members comprising:
   a plurality of first lamina members having a central segment and a plurality of radially directed finger elements, each of said first lamina finger elements terminating in a flux gathering portion;
   said flux gathering portions being angularly displaced with respect to the plane of the central segment and radially directed finger elements; and
   a plurality of substantially planar second lamina members having a central core and a plurality of radially directed finger elements, each of said second lamina members interposed between a pair of first lamina members.

2. The laminated core of claim 1 wherein the flux gathering portions of the first lamina members are arranged at an angle with respect to the plane of the central segment determined by the formula $$\alpha = \arc \cos t_1/t_1 + t_2$$

where $t_1$ is the thickness of a first lamina member and $t_2$ is the thickness of a second lamina member.

3. The laminated core of claim 1 wherein the core comprises:
   first and second substantially identical laminated core sections;
   said laminated sections comprising a plurality of first and second lamina members alternatingly arranged with second lamina members intermediate first lamina members;
   said first and second laminated sections being coaxially positioned with a first lamina member of each section in abutting relation and having the flux gathering portions of each section directed axially away from the other section.

4. A laminated rotor or armature core for a dynamoelectric machine comprising in combination:
   a plurality of nesting lamina members, each having a plurality of radially directed finger elements; and
   a plurality of flux gathering portions, having both a radial and an axial extent, connected to axially alternate ones of the radially directed fingers the plurality of lamina members comprising:
   a plurality of substantially identical lamina members having an even number of radially directed finger elements circumferentially alternating ones of which terminate in a flux gathering portion; and
   adjacent ones of the lamina members being rotated by an amount so that a flux gathering portion of a first lamina is adjacent a finger element of a second lamina which does not terminate in a flux gathering portion.

5. The laminated core of claim 4 wherein the flux gathering portions of the lamina members are arranged at an angle with respect to the plane of the central segment of about 60°.

6. The laminated core of claim 4 wherein the core comprises:
   first and second substantially identical laminated sections;
   said laminated sections each comprising a plurality of lamina members;
   said first and second laminated sections coaxially arranged so that the flux gathering portions of each laminated section are directed away from the other laminated section.

7. The laminated core of claim 6 wherein the central segment of a lamina member of the first laminated section is in abutting contact with the central segment of a lamina member of the second laminated section.

8. The laminated core of claim 7 wherein the flux gathering portions of the abutting lamina of the first and second laminated sections are radially substantially aligned.

* * * * *